May 2, 1967  A. YARDLEY  3,316,816
SERVO MOTORS FOR VEHICLE BRAKE SYSTEMS
Filed June 6, 1966  2 Sheets-Sheet 2

3,316,816
SERVO MOTORS FOR VEHICLE BRAKE SYSTEMS

Alfred Yardley, Blackheath, England, assignor to Girling Limited, Tyseley, Birmingham, Warwickshire, England, a British company
Filed June 6, 1966, Ser. No. 555,501
6 Claims. (Cl. 91—369)

This invention concerns servo motors for vehicle brake systems and relates more generally to fluid flow control valves for use more especially in such servo motors.

According to one feature of the present invention, a fluid flow control valve assembly comprises a valve seat member including a pair of relatively stationary valve seats each circumscribing passage means in said seat member, and a common valve closure member engageable with and selectively pivotable about each seat to thereby open the passage means circumscribed by the other said seat.

Preferably the valve seats are radially spaced, annular valve seats which are engageable with an annular valve closure member or with annular faces on a valve closure member.

According to another feature of the invention, a servo motor or booster for a vehicle brake system comprises a housing which is internally divided by a movable wall to define a pair of fluid chambers of which one is selectively connectable to a pair of pressure fluid sources at different fluid pressures by means of a fluid flow control valve having fluid flow passages terminating in a pair of relatively stationary valve seats, and said valve seats are selectively engageable by a common valve closure member which is tilted or pivoted on one of said seats in order to open the fluid flow passage associated with the other seat.

Figure 1:
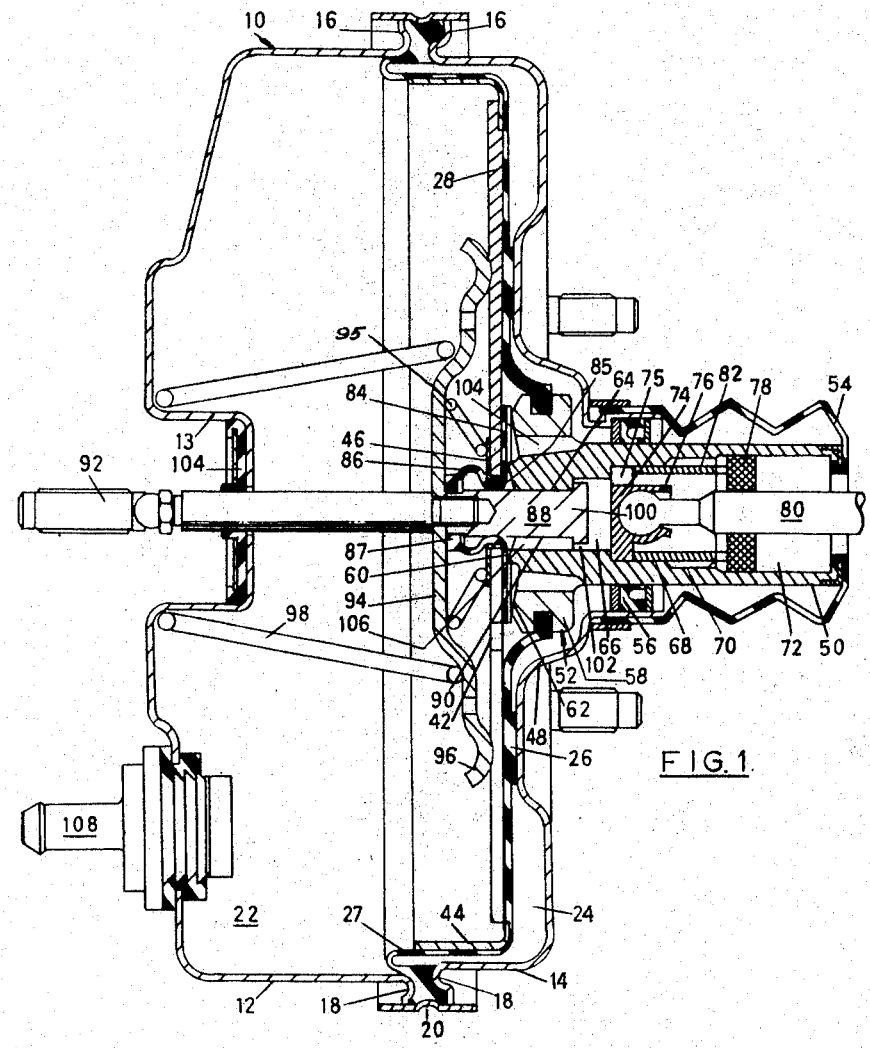
Figure 2:
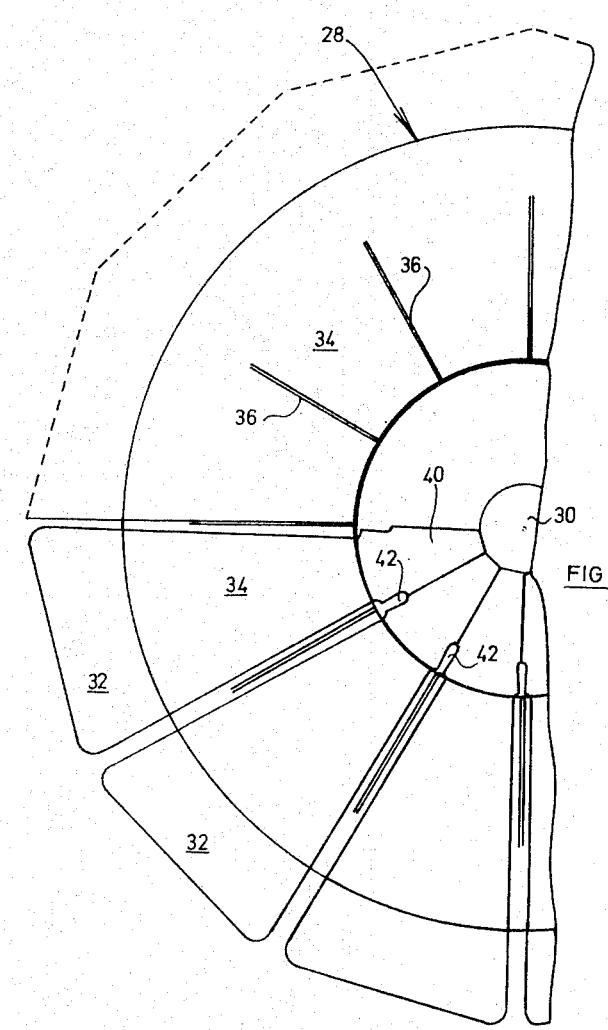
Figure 3:
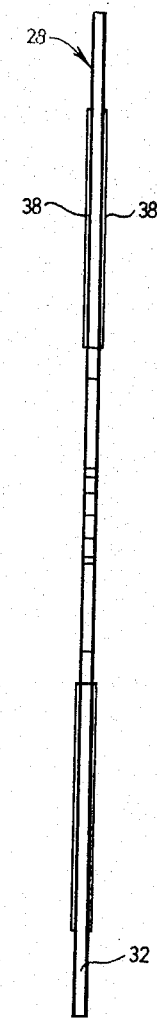
Figures 4, 5:
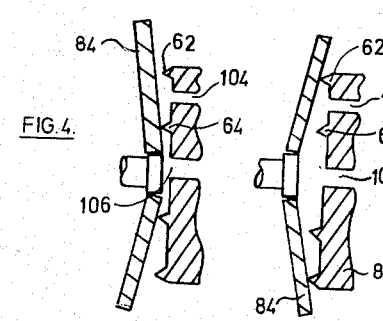

The invention will be described further, by way of example, with reference to the accompanying drawings, in which:

FIG. 1 is a section, taken on two mutually inclined axial planes, through a mechanical booster embodying the invention, FIG. 2 is a front elevation of a part of a deflecting plate, FIG. 3 is an end view of the deflecting plate, and FIGS. 4 and 5 are diagrammatic sectional details showing the fluid flow control valve in its two operated conditions.

In the booster shown in the drawings, a housing generally designated by the reference numeral 10 is made up of two cylindrical, cupped parts 12 and 14 which are peripherally formed with radially outwardly directed flanges 16 including opposed bead portions 18 between which is clamped the outer peripheral edge of a cylindrical elastic diaphragm 20 serving to divide the interior of the housing 10 into two fluid chambers 22 and 24. Intermediate its inner and outer edges, the elastic diaphragm 20 is formed with a thickened annular abutment 26 which bears against an inwardly stepped part of the end wall of the housing part 14, whilst radial support for the diaphragm is provided by a plate 28 fitted within the housing part 14 and having a central opening 30. The deflecting plate is illustrated in more detail in FIGS. 2 and 3 and will be seen to comprise a plurality of rigid radial fingers 32 held in regularly circularly spaced relationship in pockets 34 formed by making radial welds 36 between sheets 38 of plastics material placed one upon the other. The fingers 32 are provided at their inner ends with semi-barbed heads 40 and over the remainder of their length are of outwardly divergent shape, the barbed heads 40 and the divergent shape of the fingers serving to locate them securely in a radial direction. To facilitate insertion of the fingers into the pockets 34, it will be noted that the welds 36 are not extended over the whole radial length of the sheets 38 but stop short of the outer periphery, thus, in effect, creating open mouths for the pockets. It will further be noted that by virtue of the barbed shape of their edges, the heads 40 define between them spaces 42 which constitute passages enabling the two sides of the deflecting plate to communicate with one another.

Within the housing 10, the deflecting plate 28 is supported at its outer periphery by a flanged ring 44 which is fitted within an axially directed portion 27 of the elastic diaphragm 26 by which the outer edge of that diaphragm is joined to the radially extending part thereof. The inner ends of the fingers 32 are engaged and supported by a flanged ring 46 which passes through the opening 30 of the deflecting plate 28.

Axially of its end wall, the housing part 14 has a rearwardly extending, stepped flange of annular configuration through which passes the hollow stem 50 of a valve seat member generally designated 52. A flexible bellows or boot 54 extends between the free ends of the annular flange 48 and the sleeve 50 to seal the two relative to one another and a lip seal 56 engaged between the flange and the stem isolates the interior of the flange together with the fluid chamber 24 from atmospheric air. At its inner end, the hollow stem 50 terminates in an annular head 58 having a pair of radially spaced, annular valve seats 60 and 62 upstanding from its free end face. The valve head 58 is axially bored at 64 to communicate with the hollow interior of the stem 50, and at axially spaced intervals behind its junction with the head, the stem 50 is internally formed with a number of stepped counterbores 66, 68, 70 and 72. A circular disc 74 having an upstanding central socket portion 76 is butted against the shoulder defined between the counterbores 66 and 68 and an axially apertured air filter 78 is similarly supported by the shoulder between the counterbores 70 and 72. The air filter 78 in turn supports a ball-ended input rod 80 having its ball end engaged in the socket 76 and a cylindrical bush 82 extends between the filter and the disc 74 to maintain the latter in its proper position.

A common valve closure member 84 in the form of an elastic disc having an axially directed sleeve 86 and a stiffened outer margin is supported centrally on the deflecting plate 28, the sleeve 86 of the valve member passing through the flanged ring 46 at the inner ends of the fingers 32. The valve closure member 84 is engageable with both the valve seats 60 and 62 and its sleeve 86 also sealingly engages the shank 90 of an extension 88 of an axially directed output rod 92 having one end passing out of the housing 10. This extension 88 is screwed on to a threaded inner end portion of the output rod 92 and between said threaded end and the extension 88 there is trapped a dished plate 94 having a peripheral bead 96 which is urged against the deflecting plate 28 by a spring 98 acting between the housing part 12 and the dished plate 94. At its outer end, the extension 88 has a head 100 formed with one or more axial passages 102 to allow atmospheric air to flow from the air filter 78 to the inner valve seat 60 and it will be seen that the head 100 is slidably mounted in the axially aligned counterbore 66 of the stem 50 of the valve seat member. The output rod 92 is thus positively aligned with the input rod 80 and a direct mechanical connection between the output rod and the input rod can be established by way of the disc 74, the stem 50 and the extension 88. It will be noted that the common valve closure member 84 is provided with two axially spaced portions situated respectively at the ends of the sleeve 86, the first portion 85 lying immediately below the deflecting plate 28 between the ring 46 and the shank 90 of the extension 88, and the second portion 87 being spaced forwardly of the first portion to act as a seal.

The end wall of the housing part 12 has an inwardly extending axial annular flange 13 through which the output rod 92 passes, a dirt-excluding seal 104 being seated in the flange 13 to embrace the rod 92, and the spring 98 is engaged around the flange 13, serving through the deflecting plate 28 to maintain the closure member 84 urged towards the valve seats 60 and 62. The spring 98 also acts to normally retain the output rod 92 in a retracted position within the housing 10. The output rod 92 is adapted at its free outer end to be connected to a member such as the piston (not shown) of a brake master cylinder. It will be noted that the space between the valve seats 60 and 62 communicates with the fluid chamber 24 through a passage 104 formed in the seat member 84 whilst a second passage 106 in the member 84 and opening into the area bounded by the inner valve seat 60 leads to atmosphere through the passages 102 in the head 100 and through apertures 75 formed in the disc 74.

In the operation of the booster described herein, with the brakes released, the return spring 98 normally urges the output rod 92 as shown in the drawings, so that the diaphragm 26 rests against the end wall of the housing part 14 and the deflecting plate 28 tilts the closure member 84 about the inner valve seat 60 by virtue of the force exerted by the spring 98 through the dished plate 94 and a further spring 95 arranged between the dished plate 94 and the ring 46 and the inner ends of the fingers 32. The spring 95 may alternatively be of the Bellville washer type having a number of resilient fingers. The tilting of the closure member 84 about the inner valve seat 60 lifts it from the outer valve seat 62 and enables the two chambers 22 and 24 of the housing 10 to communicate with one another through the apertures 42 in the deflecting plate and through apertures 95 in the dished plate 94 and vacuum is thereby applied to both chambers through a vacuum connection 108 carried on the end wall of the housing part 12. In this deenergised condition, the two fluid chambers of the booster are referred to as being "vacuum-suspended."

When the brake pedal is depressed to operate the brakes, the stem 50 and the head 58 of the valve seat member are moved to the left, the first result of this movement being to remove the previous deflection of the plate 28 and allow the valve closure member 84 to close against both seats 60 and 62 as shown in FIG. 1. The two fluid chambers 22 and 24 are thus isolated from one another. Further depression of the brake pedal with consequent further movement of the head 58 to the left then causes the plate 28 to deflect in the opposite direction, closing the member 84 against the outer valve seat 62 and moving it off the inner seat 60. This causes the fluid chamber 24 to be connected to atmosphere through the passages 104, 106, 66 and 75 and through the air filter 78, establishing a pressure differential between the chambers 22 and 24 which moves the diaphragm 26 to the left, together with the deflecting plate 28 and the dished plate 94, thereby imparting to the output rod 92 an output force which combines with the input applied to the rod 80 to constitute an operating force for the master cylinder piston.

The invention thus provides a differential pressure booster which is controlled by a valve which is simple and economical in manufacture and assembly, and involves a minimum of moving parts, being dependent for its operation only upon deflection of the plate 28 to tilt the closure member 84 about the valve seats 60 and 62, this in turn contributing to reliability in operation. The arrangement proposed by the invention further enables a reaction force to be transmitted back to the brake pedal to provide what is commonly referred to as "feel," enabling an operator to judge the extent to which the brakes have been applied. In this connection, the annulus at which the peripheral bead 96 of the dished plate 94 engages the fingers 32 of the deflecting plate 28 is spaced radially inside the imaginary annulus representing the centre of pressure applied to the elastic diaphragm 26, so that the fingers 32 transmit a proportion of the load acting on the diaphragm back to the stem 50 of the valve seat member 52 through the outer valve seat 62 and the head 58. A reaction is thus applied to the input rod 80 to provide the aforementioned "feel."

Following a braking operation, when the brake pedal is released, atmospheric pressure initially continues to be applied to the diaphragm 26, which is thus biased forwardly to open the valve seat 62 and close the seat 60, isolating the chamber 24 from atmosphere and connecting it to the chamber 22, resulting in the re-establishment of the vacuum-suspended condition.

Although the invention has been described as applied to a mechanical booster, it will be clear that by simple modification of the arrangement comprised by the stem 50 of the valve seat member 52 and of the input rod 80, it is equally applicable to hydraulic boosters.

I claim:
1. A fluid flow control valve assembly comprising a valve seat member formed with a pair of radially spaced passage means, a pair of relatively stationary and substantially concentric valve seats on said member said each circumscribing one of said passage means, and a common valve closure member engageable with and selectively pivotable about each seat to thereby open the passage means circumscribed by the other said seat.

2. A servo motor for a vehicle braking system of the kind including a pair of fluid pressure sources of different fluid pressures, comprising an internally hollow housing, a movable wall within said housing and dividing the hollow interior thereof into contiguous first and second fluid chambers, a motor output member displaceable by said wall and extending externally of said housing, and fluid flow control valve means for selectively connecting the first chamber to said fluid pressure sources with the second chamber permanently connected to one of said sources only, thereby enabling a fluid pressure differential to be established between said chambers for moving said wall within said housing, said control valve means comprising a valve seat member formed with a pair of spaced passage means, a pair of relatively stationary valve seats on said member and each circumscribing one of said passage means, and a common valve closure member engageable with and selectively tiltable about each seat to thereby open the passage means circumscribed by the other said seat, the end of one of said passage means remote from said valve seats being permanently connected to one of said fluid sources and the corresponding end of the other said passage means being permanently connected to said first chamber.

3. A servo motor as set forth in claim 2, comprising two cylindrical, cupped parts peripherally connected together in fluid-tight relation to constitute said housing, said movable wall being an annular elastic diaphragm having its outer periphery clamped between said cupped parts, an annular plate extending radially within said housing, and a plurality of regularly circularly spaced, rigid radial fingers on said plate and capable of deflecting and flexing relative to the remainder of said plate, said plate providing radial support for said diaphragm, and wherein said valve seat member comprises a head, said valve seats being radially spaced, annular valve seats provided on said head, and an internally hollow stem carrying said head and extending axially of said housing, the valve closure member being caried on said annular plate opposite said head, and means resiliently biasing said plate and valve closure member towards said head, the inner periphery of said diaphragm being supported on said head.

4. A servo motor as set forth in claim 3, further comprising an input member to said motor extending axially within said stem of said valve seat member and mechanically connected to said stem, said ouput member passing into said housing in an axially opposite direction to said stem and in axial alignment therewith, an extension on said output member between the inner end of said output member and said head, said head being formed with an axial bore and said extension engaging slidably in said bore, and an annular dished plate clamped between said output member and said extension, a spring constituting the biasing means acting between the housing and said dished plate.

5. A servo motor as set forth in claim 4, wherein said valve closure member is of annular configuration having an annular face in seating relation with said valve seats, said closure member comprising an axial sleeve and a pair of axially spaced portions on said sleeve, one of said portions being situated between said fingers and said extension and the other said portion constituting a fluid seal against said output member and said dished plate.

6. A servo motor as set forth in claim 2 wherein said passage means are radially spaced with respect to each other and said valve seats are annular and substantially concentric with respect to each other.

References Cited by the Examiner

UNITED STATES PATENTS

| | | | |
|---|---|---|---|
| 2,947,319 | 8/1960 | Kaldobsky | 137—627.5 |
| 3,016,881 | 1/1962 | Wilkens et al. | 91—369 |
| 3,183,789 | 5/1965 | Stelzer | 91—369 |
| 3,249,021 | 5/1966 | Wuellner | 91—369 |

FOREIGN PATENTS

| | | |
|---|---|---|
| 493,921 | 10/1950 | Belgium. |
| 545,222 | 5/1942 | Great Britain. |

MARTIN P. SCHWADRON, *Primary Examiner.*
PAUL E. MASLOUSKY, *Examiner.*